United States Patent

Fukuda et al.

(10) Patent No.: US 9,199,191 B2
(45) Date of Patent: Dec. 1, 2015

(54) GAS SEPARATION MEMBRANE MODULE AND METHOD OF REPLACING A HOLLOW FIBER ELEMENT

(71) Applicant: UBE INDUSTRIES, LTD., Ube-shi, Yamaguchi (JP)

(72) Inventors: Nobuhiko Fukuda, Ube (JP); Tomohide Nakamura, Tokyo (JP); Nozomu Tanihara, Ube (JP); Yutaka Kanetsuki, Ube (JP); Manabu Hayashi, Ube (JP)

(73) Assignee: UBE Industries, Ltd., Yamaguchi (JP)

( * ) Notice: Subject to any disclaimer, the term of this patent is extended or adjusted under 35 U.S.C. 154(b) by 212 days.

(21) Appl. No.: 13/967,598

(22) Filed: Aug. 15, 2013

(65) Prior Publication Data

US 2014/0047982 A1 Feb. 20, 2014

(30) Foreign Application Priority Data

Aug. 17, 2012 (JP) ................................. 2012-181036
Aug. 29, 2012 (JP) ................................. 2012-188912

(51) Int. Cl.
*B01D 53/22* (2006.01)
*B01D 63/04* (2006.01)

(52) U.S. Cl.
CPC .............. *B01D 53/22* (2013.01); *B01D 63/043* (2013.01); *B01D 2313/025* (2013.01); *B01D 2313/10* (2013.01); *B01D 2313/12* (2013.01); *Y10T 29/49826* (2015.01)

(58) Field of Classification Search
CPC ................. B01D 53/22; B01D 63/043; B01D 2313/025; B01D 2313/10; B01D 2313/12; Y10T 29/49826
See application file for complete search history.

(56) References Cited

U.S. PATENT DOCUMENTS

| | | | | |
|---|---|---|---|---|
| 3,422,008 | A | * | 1/1969 | McLain ......................... 210/646 |
| 4,207,192 | A | * | 6/1980 | Coplan et al. ............. 210/321.88 |
| 4,220,489 | A | * | 9/1980 | Coplan et al. ................. 156/73.6 |
| 4,352,736 | A | * | 10/1982 | Ukai et al. ............... 210/321.88 |
| 4,358,377 | A | * | 11/1982 | Clark .......................... 210/323.2 |
| 4,368,124 | A | * | 1/1983 | Brumfield ................ 210/321.79 |
| 5,470,469 | A | * | 11/1995 | Eckman ..................... 210/321.8 |
| 5,914,154 | A | * | 6/1999 | Nemser .......................... 427/245 |
| 6,224,763 | B1 | * | 5/2001 | Feng et al. ..................... 210/232 |
| 7,404,843 | B2 | * | 7/2008 | Kaschemekat et al. ........... 95/45 |
| 7,758,670 | B2 | * | 7/2010 | Wynn et al. ........................ 95/45 |
| 7,918,921 | B2 | * | 4/2011 | Wynn ................................ 95/45 |

(Continued)

FOREIGN PATENT DOCUMENTS

JP 2008-178872 8/2008

*Primary Examiner* — Jason M Greene
*Assistant Examiner* — Anthony Shumate
(74) *Attorney, Agent, or Firm* — Nixon Peabody LLP; Jeffrey L. Costellia

(57) ABSTRACT

A gas separation membrane module, comprising: a hollow fiber element having a hollow fiber bundle consisting of a number of hollow fiber membranes and a tube sheet provided at an end of the hollow fiber bundle for binding the hollow fiber membranes; a vessel having an opening through which the hollow fiber element is inserted or removed; a lid member having a gas outlet formed therein and attached to cover the opening of the vessel; and a perforated plate having a plurality of through holes for forming gas channels formed therein, the perforated plate being mounted between the tube sheet and the lid member, the gas separation membrane module performing gas separation by supplying mixed gas to the hollow fiber membranes.

6 Claims, 8 Drawing Sheets

(56) References Cited

U.S. PATENT DOCUMENTS

| | | | |
|---|---|---|---|
| 8,182,592 B2* | 5/2012 | Nakamura et al. | 96/8 |
| 8,562,876 B2* | 10/2013 | Sternberg | 264/48 |
| 2006/0174762 A1* | 8/2006 | Kaschemekat et al. | 95/45 |
| 2008/0011157 A1* | 1/2008 | Wynn et al. | 95/45 |
| 2009/0020008 A1* | 1/2009 | Wynn | 95/45 |
| 2009/0139925 A1* | 6/2009 | Sternberg | 210/321.72 |
| 2010/0326278 A1* | 12/2010 | Nakamura et al. | 96/8 |
| 2014/0014568 A1* | 1/2014 | Sternberg | 210/321.72 |
| 2014/0208947 A1* | 7/2014 | Fautsch et al. | 96/8 |

* cited by examiner

GAS SEPARATION MEMBRANE MODULE AND METHOD OF REPLACING A HOLLOW FIBER ELEMENT

TECHNICAL FIELD

The present invention relates to a gas separation membrane module which achieves gas separation using a hollow fiber membrane, particularly to a gas separation membrane module in which the deformation of a tube sheet can be prevented by suppressing the deformation of a perforated plate, thereby reducing the risk of breakage of the tube sheet and the like.

BACKGROUND ART

Conventionally employed separation membrane modules include a plate and frame type, a tubular type, a hollow fiber membrane type and the like for achieving gas separation (for example, oxygen separation, nitrogen separation, hydrogen separation, vapor separation, carbon dioxide separation, and organic vapor separation) using separation membranes with permselectivity. Among them, the gas separation membrane module of a hollow fiber membrane type is industrially beneficial and widely used due not only to an advantage of the largest membrane area per unit volume but also to high resistance to pressure and excellent self-support property.

Various gas separation membrane modules of the hollow fiber membrane type have been proposed conventionally, which include a hollow fiber element (described later in detail) replaceable in a vessel. Such a hollow fiber element has a hollow fiber bundle consisting of a number of hollow fiber membranes with permselectivity, a hardened sheet (tube sheet) made of resin, formed at one end or both ends of the hollow fiber bundle and the like. The hollow fiber element is a replaceable component configured to be removably mounted into the vessel.

JP2008-178872 has disclosed a gas separation membrane module of a shell feed type, including a hollow fiber element, a vessel having an opening for inserting the hollow fiber element into and out of the vessel, and a lid attached to cover the opening. In the gas separation membrane module, a high-pressure mixed gas is fed to the hollow fiber element for gas separation. Specifically, a member called a perforated plate, having a plurality of through holes formed therein, is disposed between a tube sheet of the hollow fiber element and the lid. The perforated plate and the lid are configured to receive pressure from the tube sheet so as to prevent deformation of the tube sheet.

Patent Document: Japanese Patent Laid-Open No. 2008-178872

SUMMARY OF INVENTION

Problem to be Solved by Inventions of this Section

Even the configuration as described in JP2008-178872 may basically achieve favorable separation of the high-pressure mixed gas. With respect to a perforated plate described in the document, however, a recess portion is formed in a part of a surface closer to the lid and the through hole is formed in a thinner portion not in contact with the lid. Therefore, this portion of the perforated plate may be deformed. To prevent the deformation of the tube sheet more reliably, the configuration still has room for improvement.

It is thus an object of the present invention to provide a gas separation membrane module in which the deformation of a tube sheet can be prevented by suppressing the deformation of a perforated plate, thereby reducing the risk of breakage of the tube sheet and the like.

Means for Solving the Problems

To accomplish the object, the present invention provides:
1. A gas separation membrane module, comprising:
   a hollow fiber element having a hollow fiber bundle consisting of a number of hollow fiber membranes and a tube sheet provided at an end of the hollow fiber bundle for binding the hollow fiber membranes;
   a vessel having an opening through which the hollow fiber element is inserted or removed;
   a lid member having a gas outlet formed therein and attached to cover the opening of the vessel; and
   a perforated plate having a plurality of through holes for forming gas channels formed therein, the perforated plate being mounted between the tube sheet and the lid member,
   the gas separation membrane module performing gas separation by supplying mixed gas to the hollow fiber membranes,
   wherein the perforated plate has
   (a) a flat portion, on a surface closer to the lid, the flat portion configured to generally be in contact with the lid member when mounted; and
   (b) a channel forming recess portion, formed in a portion of the surface closer to the lid other than the flat portion, for forming a gas channel;
   (c) said through hole being formed to extend over the flat portion and the channel forming recess portion in a planar view of the perforated plate, so that the through hole can communicates with the channel forming recess portion.
2. The gas separation membrane module of the above, wherein at least one of the through holes is formed as an elongated hole.
3. The gas separation membrane module of the above, wherein all the through holes are elongated holes, each elongated holes formed radially in a planar view of the perforated plate.
4. The gas separation membrane module according to of the above, wherein the channel forming recess portion is formed at an area facing to the gas outlet in the lid member.
5. The gas separation membrane module according to of the above, wherein the perforated plate further has:
   (d) a recess portion, formed in a surface closer to the tube sheet, for forming a gas channel for directing a gas from an end portion of the tube sheet to the through hole.
6. The gas separation membrane module according to of the above, wherein the hollow fiber element further has, in addition to the hollow fiber bundle and the tube sheet, a core pipe disposed substantially at the center of the hollow fiber bundle, a first end of the core pipe being bonded to the tube sheet and a second end configured to be fixed to a portion within the vessel.

In the present application, the term substantially center includes both the center and a substantial center.

The term "generally in contact with" includes both being contact and being substantially contact.

The term "lid member" is intended to refer to a member attached to cover an opening or the like, and is not necessarily limited to a member for closing that position.

According to the present invention, the gas separation membrane module can be provided in which the deformation of the tube sheet can be prevented by suppressing the deformation of the perforated plate, thereby reducing the risk of breakage of the tube sheet and the like.

DETAILED DESCRIPTION

Embodiments of gas separation membrane modules will hereinafter be described in Section I and II. It is noted that background art and a problem to be solved for the inventions of Section II will be described in the description for Section II. It is also noted that one or more technical matters disclosed in one section are combinable to those disclosed in the other section as appropriate. Although some terms indicating directions such as right, left, top, and down may be used in the following description, these terms are not intended to limit the present invention in any manner. In this specification, for example, FIG. 3A and FIG. 3B may be referred as simply FIG. 3.

Section I: A Gas Separation Membrane Module in Which Deformation of a Tube Sheet can be Prevented by Suppressing Deformation of a Perforated Plate, Thereby Reducing the Risk of Breakage of the Tube Sheet and the Like (Configuration of Gas Separation Membrane Module)

Figure 1:
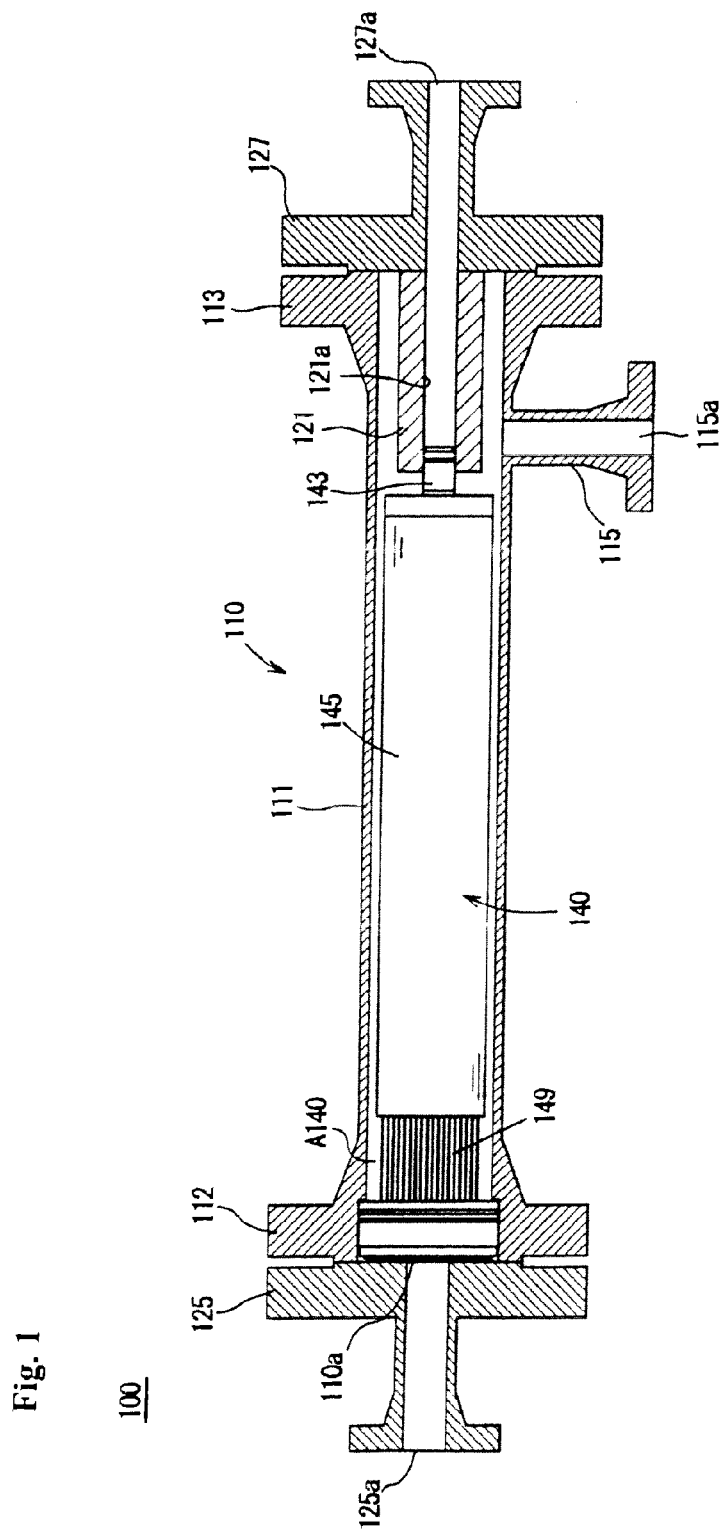
FIG. 1 is a sectional view showing an exemplary configuration of a gas separation membrane module.

FIG. 1 is a sectional view of a gas separation membrane module according to the present embodiment. A gas separation membrane module 100 is of shell feed type, and basically, performs gas separation in the same manner as that described in Japanese Patent Laid-Open No. 2008-178872 applied by the present applicant. Descriptions for the same or substantially the same components of gas separation membrane module 100 as those disclosed in JP 2008-178872 are partially omitted.

As shown in FIG. 1, the gas separation membrane module 100 includes a replaceable hollow fiber element 140, a cylindrical vessel 110 for housing the hollow fiber element 140, and lid members 125, 127 attached to both ends of the cylindrical vessel 110.

Figure 2:
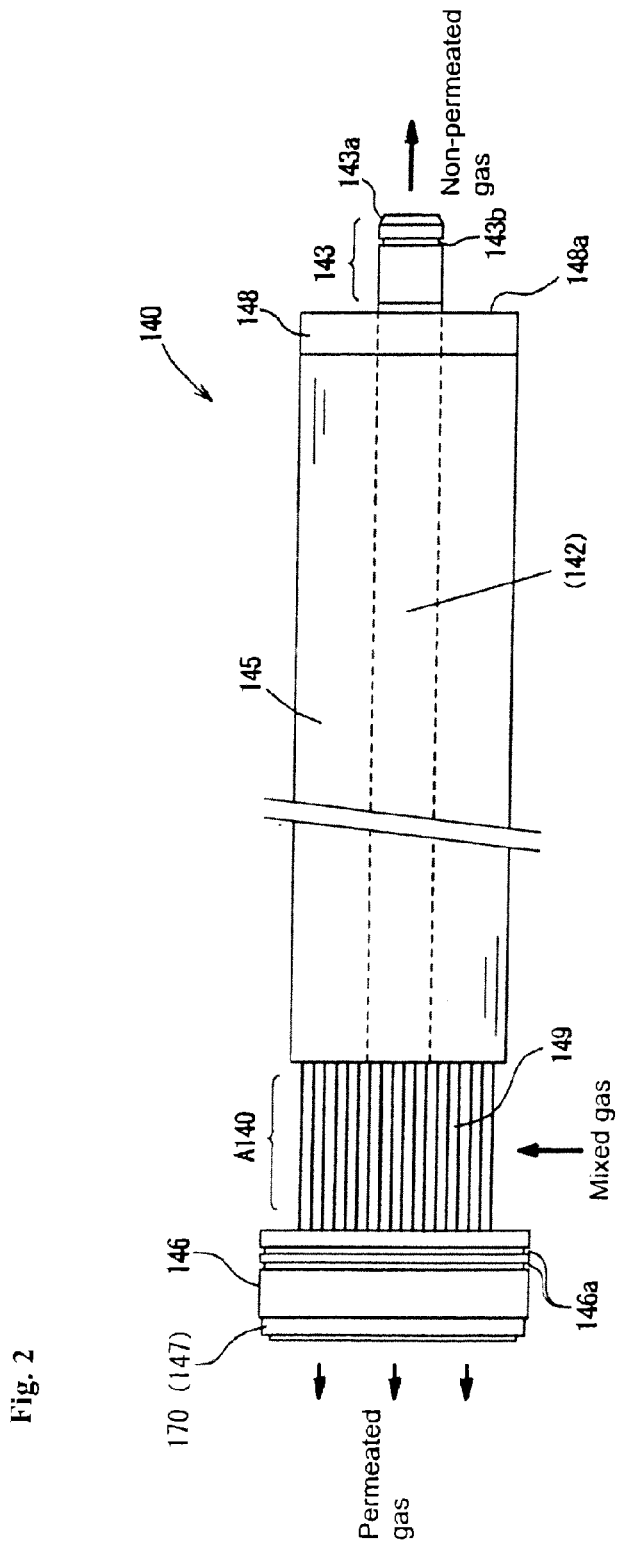
FIG. 2 is a side view of a hollow fiber element removably mounted in the module in FIG. 1.

As shown in FIG. 2, the hollow fiber element 140 has a hollow fiber bundle 149 provided by tying a number of hollow fiber membranes in a bundle. The hollow fiber bundle 149 may have a circular sectional shape, by way of example. Tube sheets (not shown) for holding the hollow fiber membranes are formed at one end or both ends of the hollow fiber bundler 149.

The hollow fiber membrane may be made of any material that has a gas separation property. Examples of a preferable material include a polymer material, particularly a polymer material in glass form at room temperature (23° C.) such as polyimide, polysulfone, polyetherimide, polyphenyleneoxide, and polycarbonate since they have a favorable gas separation property. Such a hollow fiber membrane can be easily formed into a loop shape.

The hollow fiber element 140 may have a core pipe 142 disposed substantially at the center of the hollow fiber bundle 149. The core pipe 142 is a hollow member in which a gas channel is formed. One end of the core pipe 142 (on the right in FIG. 2) protrudes as a nozzle portion 143 from a distal end cap 148 (described later in detail) positioned at an end of hollow fiber bundle 149. The nozzle portion 143 is to be inserted into a core pipe holding portion 121 within the vessel. A gas channel is also formed in this nozzle portion 143, with the channel being opened at the end of nozzle portion. The nozzle portion 143 has a tapered portion 143a formed at its end. The nozzle portion 143 further has an annular groove 143b formed on its outer periphery for fitting an O-ring thereto. Although not limited, each of the core pipe 142 and the nozzle portion 143 is made of metal, by way of example.

The hollow fiber element 140 has a proximal end cap 146 positioned at a proximal end of the hollow fiber bundle 149 and a distal end cap 148 positioned at a distal end thereof. A tube sheet (see reference numeral 10 in FIG. 5) for bonding the hollow fiber membranes is disposed within the proximal end cap 146. The hollow fiber membranes are bonded together with their ends opened at an outer end face of tube sheet 10. This configuration allows permeated gas flowing within the hollow fiber membranes to be discharged from the end face of the tube sheet. It should be noted that the proximal end cap 146 is not an essential component of the present invention and thus may be omitted.

The end cap 148 may be responsible for holding the end portion of the looped hollow fiber membranes, for example. The end cap 148 may has a disk shape, by way of example, and front face 148 thereof is a flat face perpendicular to the axial direction of core pipe 142. It is noted that looping of the hollow fiber membranes does not limit the present invention in any manner.

The tube sheets may be responsible for separating an inside space of the vessel, such that a space outside the hollow fiber membranes can be isolated from a space communicating to both gas channel formed in the lid member and the interior of the hollow fiber membranes. In the present embodiment, the tube sheet may have a circular profile, for example, and the outer end face thereof may be flat. The tube sheet is preferably made of thermoplastic resin such as polyethylene and polypropylene, or thermosetting resin such as epoxy resin and urethane resin, by way of example.

As shown in FIG. 2, the proximal end cap 146 may have two annular grooves 146a formed on its outer periphery for fitting O-rings thereto. These O-rings provide sealing between the outer periphery of proximal end cap 146 and the inner periphery of vessel 110. A perforated plate 170 may be attached adjacent to the proximal end cap 146. Although a single annular groove may be formed, two or more annular grooves are preferable since sealing property can be improved.

Figure 5:
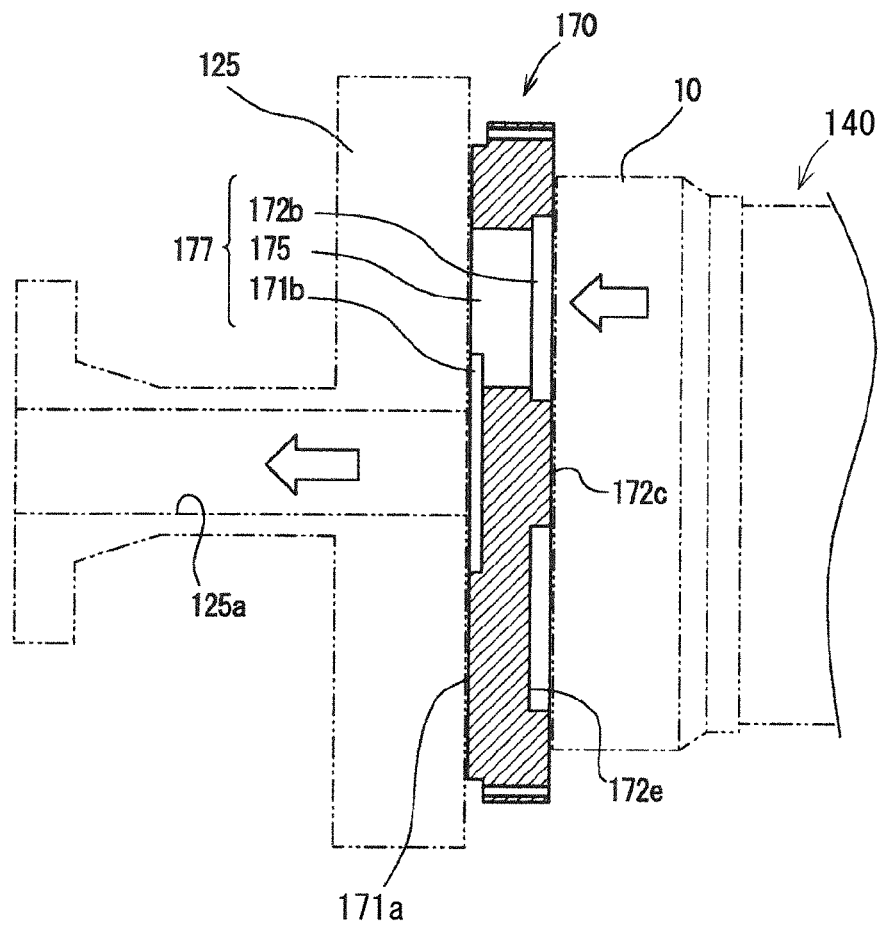
FIG. 5 is a sectional view showing the relationship of the perforated plate, a tube sheet, and a lid member when they are mounted.

The perforated plate 170 is disposed between the tube sheet 10 of hollow fiber element 140 and the lid member 125, as shown in FIG. 5. The perforated plate 170 is configured to receive pressure applied by the tube sheet 10, together with lid member 125, to thereby prevent deformation of the tube sheet 10. The perforated plate may form one or more gas channels for permeated gas from the opened ends (not shown) of the hollow fiber membranes, the gas channels configured to direct gas to a gas outlet 125a in the lid member 125. Perforated plate 170 can be made of a material such as metal, resin, or ceramic.

The detailed configuration of perforated plate 170 is described later with reference to FIG. 3 to FIG. 5. First, description is made of the other structural units of gas separation membrane module 100 and the gas separation performed by gas separation membrane module 100.

The hollow fiber bundle 149 may be wound with a substantially gas-impermeable film 145, as shown in FIG. 2. Such a film 145 may cover almost all of the outer surface of hollow fiber bundle 149 (specifically, 60% or more, and particularly 80% or more of the area of the side face), except an area near the tube sheet (see "exposed portion A140", for example). The film 145 is not particularly limited as long as it is substantially impermeable to gas and has a film form, and film made of a polymer material or metal foil can be used preferably. The film 145 may be responsible for regulating flow of a gas mixture within the vessel, and for maintaining a shape of the entire hollow fiber bundle as an integral structural unit with the core pipe disposed at the center. It should be noted that part of distal end cap 148 may be extended so that it can configure a portion corresponding to the film 145.

The exposed portion A140 not covered with film 145 may be covered with a net member. A preferable example of the net member is a sheet member which is permeable to gas, particularly a sheet member having a porosity of 30 vol % or higher, more preferably 50 vol % or higher. A net member is not necessarily made of net material. A net member may be provided by a fabric, textile, cloth, or net-like sheet, made of a fiber, polymer, paper, or metal material. Particularly, an elastic net member is preferably used. The net member is responsible for maintaining the shape of the entire hollow fiber bundle as an integral structural unit with the core pipe disposed at the center without inhibiting the permeation of gas, and particularly, preventing the fluctuations of the hollow fiber membranes due to gas flow fluctuations. Thus, the end of the net member is preferably embedded in and fixed to the tube sheet together with the hollow fiber membranes.

The core pipe 142 is configured to prevent deformation of the hollow fiber element 140 to thereby maintain its shape. A proximal end of the core pipe 142 (the end on the left in FIG. 2, not shown) may be bonded within the tube sheet 10. Bonding may be performed by embedding a part of the core pipe 142 itself in tube sheet 10. Alternatively, a core pipe 142 can be connected, through screwing, by for example using a threaded plastic member. A gas channel is formed within core pipe 142. The core pipe 142 has a plurality of holes formed in its outer peripheral face. According to such a configuration, non-permeated gas, which has not permeated the hollow fiber membranes, is directed to interior of the core pipes through the plurality of holes and then discharged through a nozzle portion 143 of the core pipe 142.

Cylindrical vessel 110 has a cylindrical portion 111 and flange portions 112, 113 formed at both ends thereof. In the example shown in FIG. 1, the cylindrical vessel 110 may be arranged horizontally. The cylindrical vessel 110 has a core pipe holding portion 121 provided therein, into which a nozzle portion 143 of the hollow fiber element 140 is to be inserted. The core pipe holding portion 121 is configured to hold the core pipe 142 in its central hole 121a and to guide gas from the core pipe 142 to the outside of the vessel. The core pipe holding portion 121 may have a tapered portion (tapered inlet, not shown) at entrance of the central hole for facilitating insertion of the nozzle portion 143. The shape of the tapered portion is not limited particularly, various tapered shapes may be used. It goes without saying that the gas separation membrane module according to the present invention is not limited to the one horizontally oriented, and vertical or other orientations may be used.

A mixed gas introducing portion 115 may be formed on cylindrical portion 111 of cylindrical vessel 110. Mixed gas from the outside is introduced into the cylindrical vessel 110 through a gas channel 115a formed in the mixed gas introducing portion 115.

Gas separation membrane module 100 configured as described above can be used as follows. First, the mixed gas is introduced into the cylindrical vessel 110 through the gas channel 115a of mixed gas introducing portion 115. Then, the introduced mixed gas flows outside film 145 toward the proximal end of hollow fiber element 140 and comes into contact with the hollow fiber membranes at an exposed portion A140. Part of the mixed gas in turn flows inside the film in the opposite direction to the mixed gas feed direction. The mixed gas flows in contact with each of the hollow fiber membranes in this manner, so that a particular component gas of the mixed gas selectively permeates the hollow fiber membranes, and the gas after the permeation (permeated gas) passes through the hollow fiber membranes and is discharged through the end portion of the tube sheet. The permeated gas is then discharged outside through the gas channel in perforated plate 170 and gas outlet 125a in lid member 125, as described later.

On the other hand, the non-permeated gas which has not permeated the hollow fiber membranes flows into the core pipe 142 through the plurality of holes formed therein, passes through the core pipe, and is directed out through nozzle portion 143. The non-permeated gas from nozzle portion 143 then passes through central hole 121a in core pipe holding portion 121 and is discharged outside through gas channel 127a in lid member 127.

Gas separation membrane module 100 of the present embodiment can be used preferably for separating and collecting a particular gas component from a mixed gas at a gauge pressure of approximately 0.1 to 30 MPa, preferably 0.2 to 25 MPa, and more preferably 1 to 25 MPa. Although not limited, the module 100 can be used preferably for applications such as separation and collection of oxygen enriched air or nitrogen enriched air from air, separation and collection of hydrogen or helium from a mixed gas containing hydrogen or helium, and selective separation and collection of methane gas and carbon dioxide from a mixed gas containing methane gas and carbon dioxide.

(Configuration of Perforated Plate)

Figure 3A:
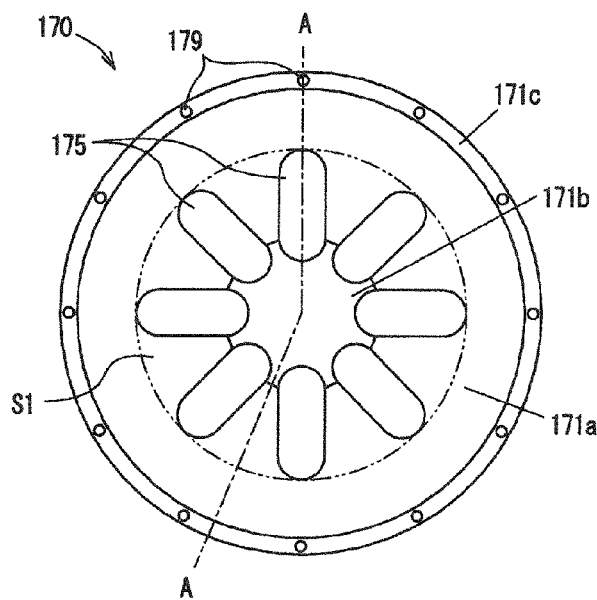
FIG. 3A is a plan view showing a perforated plate.
Figure 3B:
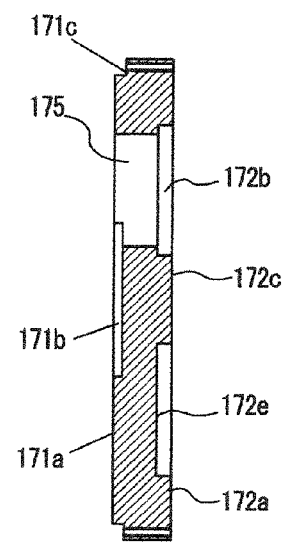
FIG. 3B is a sectional view along A-A line showing a perforated plate.

Description will hereinafter be made of the configuration and the like of perforated plate 170 provided for gas separation membrane module 100 according to the present embodiment with reference to FIG. 3 to FIG. 5. FIG. 3 shows the perforated plate, in which FIG. 3A is a plan view and FIG. 3B is a sectional view along A-A line. FIG. 4 is a perspective view showing the perforated plate with its part cut away (only one of through holes is shown, and the others are omitted). FIG. 5 is a sectional view showing relationship of the perforated plate, the tube sheet, and the lid member when they are mounted.

Figure 4:
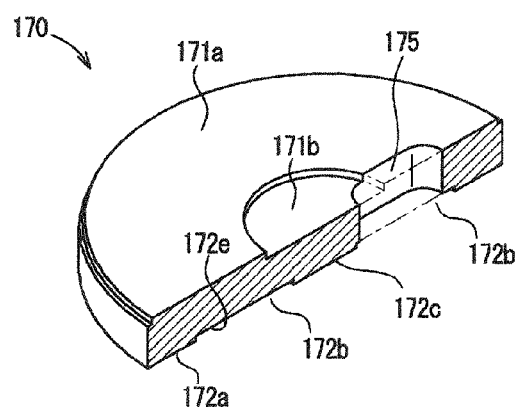
FIG. 4 is a perspective view showing the perforated plate with its part cut away (some of through holes omitted).

A perforated plate 170 has a flat disk shape as a whole, and has a plurality of through holes 175 passing through the member in its thickness direction as shown in FIG. 3 and FIG. 4. Through hole 175 may have any shape that can form a gas channel for directing permeated gas from the tube sheet toward the lid. In this example, each of through holes 175 is formed as an elongated hole. Each elongated hole has a shape in which both ends of a rectangle are formed into a semicircle or an arc with a predetermined radius of curvature, for example, but another shape may be used for the elongated hole.

The number or the positions of through holes 175 can be changed as appropriate. In the example shown in FIG. 3, eight through holes 186 are formed to extend radially from substantially the center of perforated plate 170. The number of through holes 175 may be seven or less or nine or more, and may be an even or odd number. Through holes 175 may be disposed at equal intervals (at equal angles) such that they can uniformly receive permeated gas from the end portion of the tube sheet.

As shown in FIG. 3 and FIG. 4, a surface of the perforated plate 170 closer to the lid may be mainly formed of flat face 171a. Such a flat face 171a is configured to generally contact with the lid member 125 while it is mounted. A channel forming recess portion 171b with a predetermined depth for forming the gas channel is formed at almost the center of the surface (see FIG. 4). The channel forming recess portion 171b is preferably formed at the position opposite to the opening of gas outlet 125a such that the gas within the gas channel formed by the recess portion can smoothly flow into gas outlet 125a in lid member 125. Preferably, the size of recess portion 171b is substantially equal to or larger than that of the opening.

Dimension of inner diameter and/or depth of the channel forming recess portion 171b can be determined as appropriate depending for example on flow rate of the permeated gas. By way of example, depth of channel forming recess portion 171b may range from 1 mm to 15 mm, preferably 3 mm to 8 mm. Channel forming recess portion 171b may have a circular profile, and in this case, the inner diameter of recess portion 171b may range from 1% to 60%, preferably 1% to 40% of the diameter of perforated plate 170. Preferably, the inner diameter may be at least larger than each of the diameters of gas outlet 125a and central portion 172c.

The surface of perforated plate 170 closer to the tube sheet has flat face 172a similarly to the surface closer to the lid and has recess portion 172b formed therein for forming the channel for permeated gas discharged from the end portion of the tube sheet. The recess portion 172b has an annular shape such that a central portion 172c with a circular profile is left intact. Depth of the recess portion 172b facing the tube sheet (that is, the dimension from the surface of perforated plate 170 closer to the tube sheet to bottom face 172e of the recess portion) may range from 1 mm to 15 mm, preferably 5 mm to 10 mm, for example. The central portion 172c may be a portion to be in contact with the end face of the tube sheet near the center to support tube sheet 10 directly. Thus, the central portion 172c is preferably a flat face to stably support the tube sheet 10.

The gas channel, consisting of the recess portion in the perforated plate, is preferably disposed at a position corresponding to a area where the openings of hollow fiber membrane are located in the tube sheet. The perforated plate (surface close to the tube sheet) is preferably in contact with the tube sheet in the area where the openings of the fiber membranes sheet is not present in the tube. Surface of the perforated plate facing to the tube sheet is preferably (i) in contact with the tube sheet in 0% to 15% of the overall surface area at the central portion, (ii) in contact with the tube sheet in 35% to 60% of the overall surface area at the outer peripheral portion. (iii) the recess portion preferably occupies 40% to 70% of the overall surface area.

As shown in FIG. 3, the perforated plate 170 has a stepped portion 171c on its outer peripheral portion. A plurality of holes 179 for inserting a fixing member such as a bolt may be formed in the stepped portion 171c. The perforated plate 170 is thus fixed to the proximal end cap 146 by using the fixing members such as the bolts passed through these holes 179.

In the present embodiment, as shown in FIG. 3 and FIG. 4, through hole 175 as elongated hole is formed between the flat face 171a and the recess portion 171b, in other words, the through hole 175 extends from the flat surface 171a to the recess portion 171b. According to this structure, the through hole 175 can communicate to recess portion 171b on a surface closer to the lid, and also communicate to the recess portion 172b on the surface closer to the tube sheet.

As shown in FIG. 5, the perforated plate 170 configured as described above has a plurality of gas channels 177 consisting of annular recess portion 172b, through hole 175, and recess portion 171b. The gas channel 177 allows permeated gas from the hollow fiber membranes to flow toward gas outlet 125a in lid member 125.

According to the gas separation membrane module 100 including perforated plate 170 as described above, even when a high-pressure mixed gas is fed into vessel 110 and the gas applies a high pressure to tube sheet 10 that may deform the tube sheet in its thickness direction, deformation of the tube sheet 10 can be prevented since the perforated plate 170 has the structure resistant to deformation as described below.

Specifically, a flat face 171a of the perforated plate 170 in this embodiment (except recess portion 171b in the surface closer to the lid) is configured to contact with the lid member 125 in relatively broad area. In particular, as shown in FIG. 3A, the flat face 171a and the lid member 125 contacts with each other in an area S1 (area surrounded by a chain double-dashed line in flat surface 171a) where though holes are disposed. Therefore, the deformation of the perforated plate 170 can be suppressed as compared with the conventional configuration in which the through hole is formed in the thinner portion not in contact with the lid member. As a result, deformation of the tube sheet 10 adjacent to the perforated plate 170 can be prevented.

If the through hole 175 is formed as elongated hole as in the present embodiment, each through hole 175 is opened against larger area in the end portion of the tube sheet, therefore wider gas channel can be achieved.

(Variation)

Although one embodiment of the present invention has been described, the present invention is not limited thereto. For example, the through holes 175 do not necessarily need to be formed radially, instead, at least some of the plurality of through holes 175 may be formed in parallel with each other, for example. The shape of the elongated hole is not limited to straight elongated hole as illustrated in FIG. 3, alternatively, a curved elongated hole may be used. All through holes 175 may not have the same shape. Two or three types of through holes having different shapes (width and/or length when the elongated hole is used) may be formed.

Channel forming recess portion 171b in perforated plate 170 may have a rectangular, oval, or polygonal profile, rather than circular shape. Alternatively, a plurality of channel forming recess portions 171b may be formed such that each of them connects associated through hole 175 to gas outlet 125a.

Shape of through hole 175 is not limited to uniform cross-sectional area, instead, the cross-sectional area may be continuously or stepwise reduced from the tube sheet to the lid. By way of example, a through hole may have a tapered inner periphery.

FIG. 6 is a sectional view showing another exemplary configuration in the present invention. In the FIG. 6, reference numerals such as "170-1" for perforated plate and "125-1, 125-2" for lid members are used, they are numbered by taking account of the presence or absence of the channel forming recess portion or the difference in size of the gas outlet, for example. However, the other portions are identical to those of perforated plate 170 and lid member 125 described above.

Figure 6A:
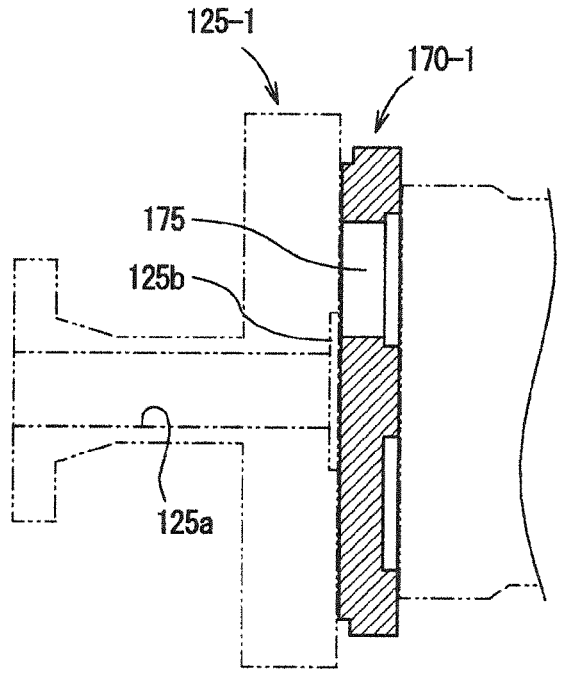
FIG. 6A is a sectional view showing an exemplary configuration of other embodiments of the invention of Section I.

In the above embodiment, the channel forming recess portion 171b is formed on the perforated plate 170. However, a channel forming recess portion 125b may be formed on a lid member 125-1 as shown in FIG. 6A. The channel forming recess portion 125b is to form a gas channel that connects through holes 175 to a gas outlet 125a. Shape of channel forming recess portion 125b is not particularly limited. The recess portion 125b may have a profile such as a circle, rectangle, oval, or polygon, and may be formed to have a depth ranging from 1 mm to 15 mm, preferably 5 mm to 10 mm, for example.

The gas separation membrane module as shown in FIG. 6A is included in an invention of this embodiment as described below.

(Gas Separation Membrane Module in Another Embodiment)

A gas separation membrane module, comprising:

a hollow fiber element having a hollow fiber bundle consisting of a number of hollow fiber membranes and a tube sheet provided at an end of the hollow fiber bundle for binding the hollow fiber membranes;

a vessel having an opening through which the hollow fiber element is inserted or removed;

a lid member having a gas outlet formed therein and attached to cover the opening of the vessel; and a perforated plate having a plurality of through holes for forming gas channels formed therein, the perforated plate being mounted between the tube sheet and the lid member, the gas separation membrane module performing gas separation by supplying mixed gas to the hollow fiber membranes, wherein:

(a) the perforated plate has a flat portion, on a surface closer to the lid, the flat portion configured to generally be in contact with the lid member when mounted, at least one of the through holes being formed in the flat portion, (b) the lid member has a channel-forming recess portion for forming a gas channel, formed therein, the gas channel communicating with the gas outlet; and (c) the through hole is formed to communicate with the channel forming recess portion.

Figure 6B:
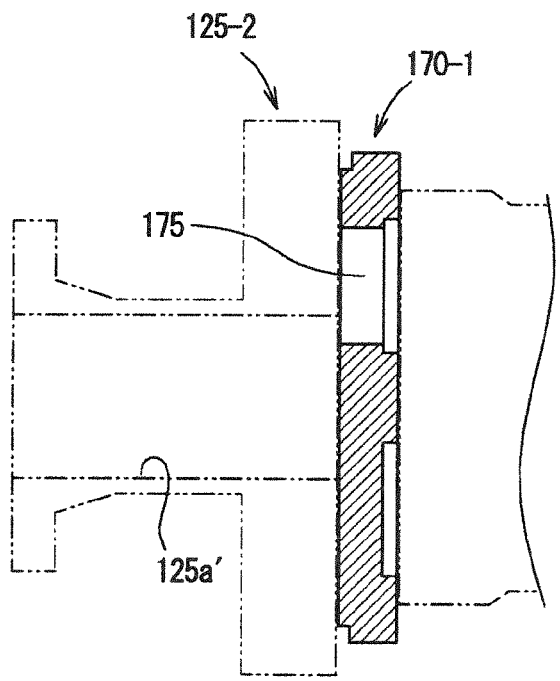
FIG. 6B is a sectional view showing an exemplary configuration of modified embodiments of the invention of Section I.

As shown in FIG. 6B, a configuration in which a channel forming recess portion is omitted from the lid member 125-2 or the perforated plate 170-1 may be used. In the configuration of FIG. 6B, specifically, a gas outlet 125a' in the lid member 125 is formed so that it has a larger inner diameter to thereby directly communicates with the through holes 175 without any channel forming recess portion (171b, 125b).

Even according to configurations as shown in FIG. 6A and FIG. 6B, a perforated plate 170-1 is resistant to deformation during gas separation as compared with the conventional configuration in which the through hole is provided for the thinner portion not in contact with the lid member. As a result, the tube sheet adjacent to perforated plate 170-1 can also be prevented from deformation.

Section II: A Gas Separation Membrane Module Allowing Easy and Accurate Mounting and the Like of a Replaceable Hollow Fiber Element and to a Method of Replacing the Hollow Fiber Element Technical Field The invention described below relates to a gas separation membrane module which achieves gas separation using a hollow fiber membrane, particularly to a gas separation membrane module allowing easy and accurate mounting and the like of a replaceable hollow fiber element and to a method of replacing the hollow fiber element.

Background Art

JP2008-178872 has disclosed a gas separation membrane module including a hollow fiber element and a vessel for housing the hollow fiber element, in which a mixed gas at a relatively high pressure is fed to the hollow fiber element to thereby achieve gas separation. In particular, the hollow fiber element has a hollow fiber bundle consisting of a number of hollow fiber membranes and a core pipe disposed at the center thereof, and a part of the core pipe protrudes from the hollow fiber bundle as a nozzle portion. To mount a hollow fiber element, it is inserted into the vessel such that the nozzle portion can connect to a predetermined core-pipe holding portion arranged within the vessel.

Problem to be Solved by Inventions of this Section

In the configuration of JP2008-178872, it is necessary to accurately position the nozzle portion of hollow fiber element with respect to the core-pipe holding portion within the vessel. For example, in cases where hollow fiber elements are relatively long, it would be difficult to control a position of the nozzle portion (in particular, a position in radial direction, or, a poison along the direction perpendicular to longitudinal axis direction). As a result, there is a problem that inserting a nozzle portion into a core-pipe holding portion needs more time. In this case, the connection may not be made appropriately between the nozzle portion and the core-pipe holding portion and thus tight sealing may not be provided between those members, thereby reducing the functionality of the gas separation membrane module. On the other hand, if an element is tried to be inserted forcefully, there would be a risk that the nozzle portion is broken.

The present invention of this section has been made in view of the problems described above, it is thus an object of the present invention to provide a gas separation membrane module allowing easy and accurate mounting and the like of a replaceable hollow fiber element and to a method of replacing the hollow fiber element.

Means for Solving the Problems

To accomplish the object, the present invention provides:

1. A gas separation membrane module performing gas separation by supplying a mixed gas to hollow fiber membranes, comprising:

(a) a replaceable hollow fiber element including a hollow fiber bundle consisting of a number of hollow fiber membranes and a core pipe disposed generally at the center of the hollow fiber bundle, a portion of the core pipe protruding as a nozzle portion;

(b) a cylindrical vessel at least having an opening, through which the hollow fiber element is inserted or removed, and a core-pipe holding portion for holding the nozzle portion and for forming a gas channel therein, the gas channel communicating with a gas channel within the nozzle portion; and (c) a lid member attached to the opening, further comprising;

a guide member for guiding the hollow fiber element while a position of the nozzle portion is maintained at a predetermined position, during insertion of the hollow fiber element into the cylindrical vessel or during pullout of the element from the cylindrical vessel.

2. The gas separation membrane module according to the above, wherein the guide member includes:

a body member having a support portion formed thereon, the support portion supporting the nozzle portion or a portion of the hollow fiber element; and a leg provided for the body member and generally abutting on an inner peripheral face of the cylindrical vessel.

3. The gas separation membrane module according to the above, wherein the guide member comprises two legs.

4. The gas separation membrane module according to the above, wherein the leg is a cylindrical rod.

5. The gas separation membrane module according to the above, wherein the cylindrical rod leg is provided generally perpendicular to the body member and is configured such that a portion of the leg extending in a first direction from the body member is longer than a portion of the leg extending in a second direction opposite to the first direction.

6. The gas separation membrane module according to the above, wherein the hollow fiber element comprises two hollow fiber elements, the two hollow fiber elements being disposed on the same axis within the cylindrical vessel.

7. The gas separation membrane module according to the above, wherein the guide member is fixed to a part of the hollow fiber element.

8. The gas separation membrane module according to the above, wherein the guide member is fixed to either the nozzle portion of the hollow fiber element or a side member disposed adjacent to an end of the hollow fiber bundle.

9. A method of replacing a hollow fiber element within a cylindrical vessel of a gas separation membrane module, comprising at least the steps of:

(a) inserting a distal end of the hollow fiber element into the cylindrical vessel through an opening of the vessel;

(b) moving the hollow fiber element further into the cylindrical vessel along an axial direction of the vessel; and (c) connecting a nozzle portion at the distal end of the hollow fiber element to a core-pipe holding portion of the cylindrical vessel, wherein, at least at the steps (b) and (c), the hollow fiber element is moved to connect the nozzle portion to the core-pipe holding portion while using a guide member maintaining a position, in height direction, of the nozzle portion at a predetermined position.

In the present application, the term "generally perpendicular" includes both being perpendicular and being substantially perpendicular. The term "generally center" includes both the center and a substantial center. The term "generally abutting" includes both abutting and substantially abutting.

The term "lid member" is intended to refer to a member attached to cover the opening or the like, and is not necessarily limited to a member for closing that position.

According to the present invention, the gas separation membrane module is provided which allows the easy and accurate mounting and the like of the replaceable hollow fiber element and the method of replacing the hollow fiber element is provided.

(Configuration of Gas Separation Membrane Module)

It should be noted that the same explanations as those described in Section I are omitted in the following description.

First Embodiment of Invention in Section II

Although in the following description embodiments basically in which a hollow fiber element (described below) is inserted horizontally are described, the present invention is not limited thereto. An embodiment in which the hollow fiber element is inserted vertically will be described in Fourth embodiment.

A perforated plate 147 may be a conventionally known one, for example, as described in JP 2008-178872. By way of example, a perforated plate 147 has a plurality of through holes (not shown) in its thickness direction and has both the function as a structural unit and the function as a gas channel. a perforated plate 147 can be made of a material such as metal, resin, or ceramic. Alternatively, perforated plates described in Section I may also be used.

A perforated plate may be configured to be mounted so that at least a portion thereof can contact with a tube sheet and support it. A perforated plate may be in contact with the tube sheet in its central portion and/or peripheral portion to support the tube sheet. Other function of a perforated plate is to create gas channel to direct permeated gas, discharged from openings of hollow fiber membranes disposed at the surface of the tube sheet, toward a gas channel formed in a lid member.

(Mounting and the Like of Hollow Fiber Element)

As described above, a hollow fiber element 140 is configured to be inserted horizontally and mount into cylindrical vessel 110 in this embodiment. In case of this configuration, it is necessary to accurately positioning a nozzle portion 143 at the distal end of hollow fiber element 140 with respect to a central hole 121*a* formed in core-pipe holding portion 121. In some cases, hollow fiber element 140 may have a length of more than one meter depending on its specifications. In this case, it would become more difficult to insert a nozzle portion 143 of hollow fiber element 140 into the central hole 121*a* of core-pipe holding portion 121.

Figure 7C:
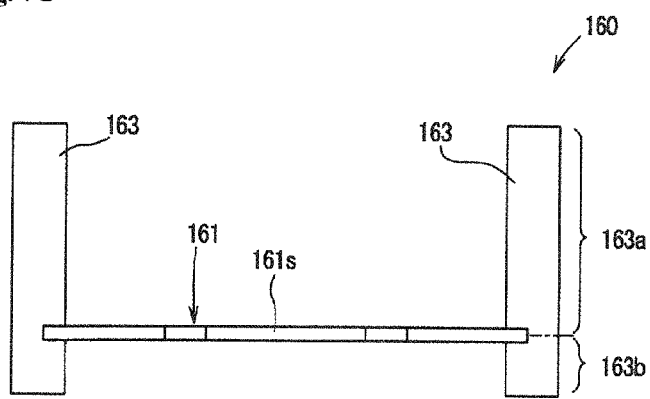
FIG. 7C is a top view showing a guide member for use in mounting the hollow fiber element.
Figure 7A:
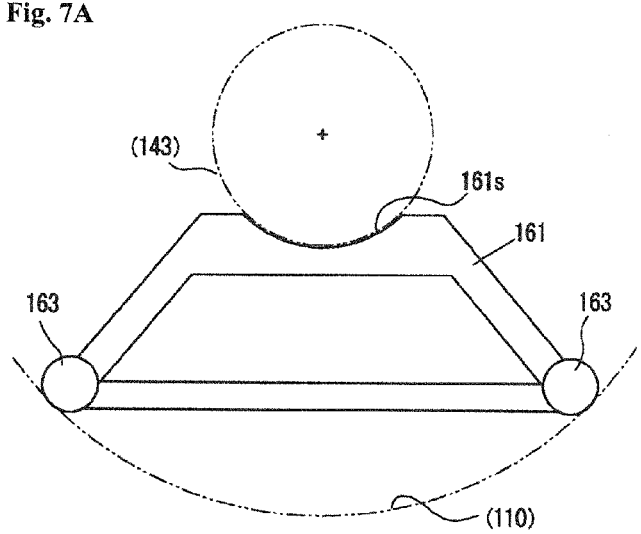
FIG. 7A is a front view showing a guide member for use in mounting the hollow fiber element.
Figure 7B:
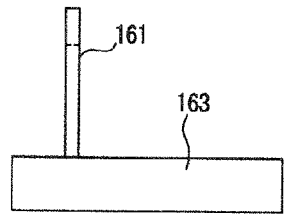
FIG. 7B is a right side view showing a guide member for use in mounting the hollow fiber element.

To address this, a guide member 160 as shown in FIG. 7A to 7C is used in the present embodiment. The guide member 160 has a body member 161, as shown in FIG. 7A, having a recessed support portion 161*s* formed therein for supporting a lower portion of a nozzle portion 143 and two legs 163 provided under the body member 161. Although not limited, each of body member 161 and legs 163 may be made of metal.

Any member or structure can be used as a guide member 160 as long as (i) it can maintaining nozzle portion 143 at a predetermined height and (ii) it is configured to be movable together with a hollow fiber element 140 within cylindrical vessel 110 during the insertion of the element. It goes without saying that a different configuration from that in FIG. 3 can be used.

A body portion 161 is a flat plate member in this example, and has a generally trapezoidal profile when viewed from the front as shown in FIG. 7A. A support portion 161*s* is formed in an upper side of the body member 161, for supporting a lower portion of nozzle portion 143*a*. The support portion 161*s* may be formed as an arc recess conforming to the outer shape of nozzle portion 143. This can stably hold nozzle portion 143. Alternatively, support portion 161s may be formed as a V-shaped groove instead of the arc recess.

Each of legs 163 is attached perpendicularly or substantially perpendicularly to the body member 161 of the flat plate shape. Leg portion 163 may be a solid or hollow cylindrical rod. According to such structures, contact area between the outer peripheral face of leg 163 and the inner peripheral face of cylindrical vessel 110 as shown in FIG. 7A is reduced, and a contact between curved lines is obtained, therefore a guide member 160 can smoothly slid on a inner surface of the cylindrical vessel 110.

With regard to a position where the body member 161 is fixed to leg 163 (see FIG. 7C), a body member 161 may be provided at the center of leg 163 in its length direction. In the present embodiment, the body member 161 is attached to leg 163 at a position shifted from the center instead. FIG. 7C shows a leg 163 in which a relatively long portion is a long portion 163a and a relatively short portion is a short portion 163b.

Description will hereinafter be made of the mounting of hollow fiber element 140 using guide member 160.

Figure 8A:
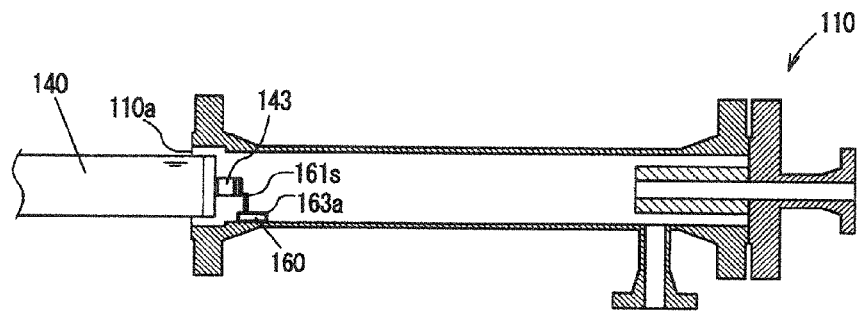
FIG. 8A is a sectional view illustrating the mounting of the hollow fiber element.

First, as shown in FIG. 8A, a guide member 160 is placed, within a cylindrical vessel 110, near the opening thereof, with a lid member 125 not attached thereto. The guide member 160 is oriented such that a long portion 163a of leg 163 faces toward the front in the insertion direction. Then, a hollow fiber element 140 is inserted into the cylindrical vessel 110 through the opening 110a so that a nozzle portion 143 of hollow fiber element 140 is supported on the support portion 161s of guide member 160.

Figure 8B:
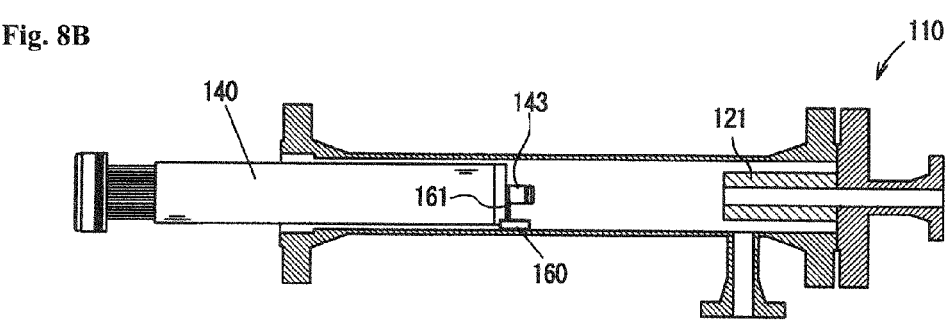
FIG. 8B is a sectional view illustrating the mounting of the hollow fiber element.

Next, as shown in FIG. 8B, a hollow fiber element 140 is further inserted into the cylindrical vessel 110. At this stage, the nozzle portion 143 is supported on a support portion 161s of the guide member 160. A front face 148a of the distal end cap of hollow fiber element 140 abuts to one surface of a body member 161. Thus, as hollow fiber element 140 is inserted, the guide member 160 is pushed by the hollow fiber element 140 and is slid.

The guide member 160 is configured to slid in this manner. In the present embodiment, since the legs 163 are cylindrical rod shape as shown in FIG. 7, the legs 163 are smoothly slid within a cylindrical vessel 110. Moreover, guide member 160 has two legs 163 formed to abut on the inner surface of cylindrical vessel 110, therefore a nozzle portion 143 can be supported stably within a cylindrical vessel 110. In addition, since a guide member 160 is oriented such that long portion 163a of leg 163 faces toward the front in the insertion direction, guide member 160 is prevented from falling in the insertion direction during sliding.

Figure 8C:
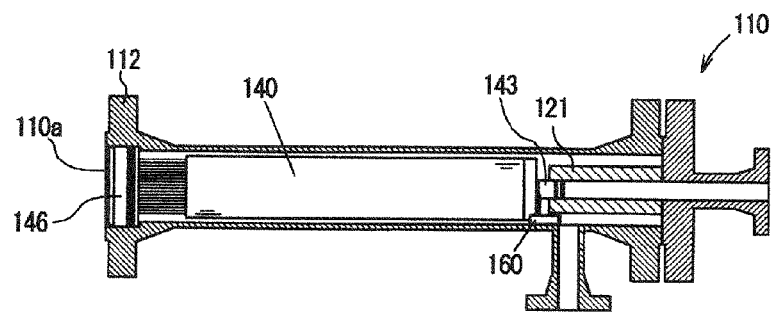
FIG. 8C is a sectional view illustrating the mounting of the hollow fiber element.

Then, the hollow fiber element 140 is moved into a position as shown in FIG. 8C so that a nozzle portion 143 can be inserted into the central hole 121a formed in core-pipe holding portion 121. Since height of the nozzle portion 143 is maintained at the predetermined position (that is, a position where axial line of nozzle portion 143 is aligned with that of central hole 121a of the core-pipe holding portion 121) by a guide member 160, the nozzle portion 143 can thus be inserted smoothly into the central hole 121a.

In a state shown in FIG. 8C, the O-ring (not shown) on the outer periphery of nozzle portion 143a can create a seal between the nozzle portion 143 and an inner periphery of core-pipe holding portion 121. In addition, O-rings (not shown) on the outer periphery of proximal end cap 146 create seals between the proximal end cap 146 of hollow fiber element 140 and an inner periphery of cylindrical vessel 110.

Finally, a lid member 125 is attached to the flange portion 112 of cylindrical vessel 110 as conventional, for example by a plurality of bolts and nuts. In this manner, gas separation membrane module 100 of the shell feed type as shown in FIG. 1 is assembled.

According to a gas separation membrane module 100 of the present embodiment configured as described above, a hollow fiber element 140 can be inserted into cylindrical vessel 110, with height of the nozzle portion 143 of hollow fiber element 140 maintained at the predetermined height position by a guide member 160, therefore accurate positioning of height of nozzle portion 143. As a result, a nozzle portion 143 can be smoothly inserted into the central hole 121a in core-pipe holding portion 121.

Second Embodiment

Figure 9:
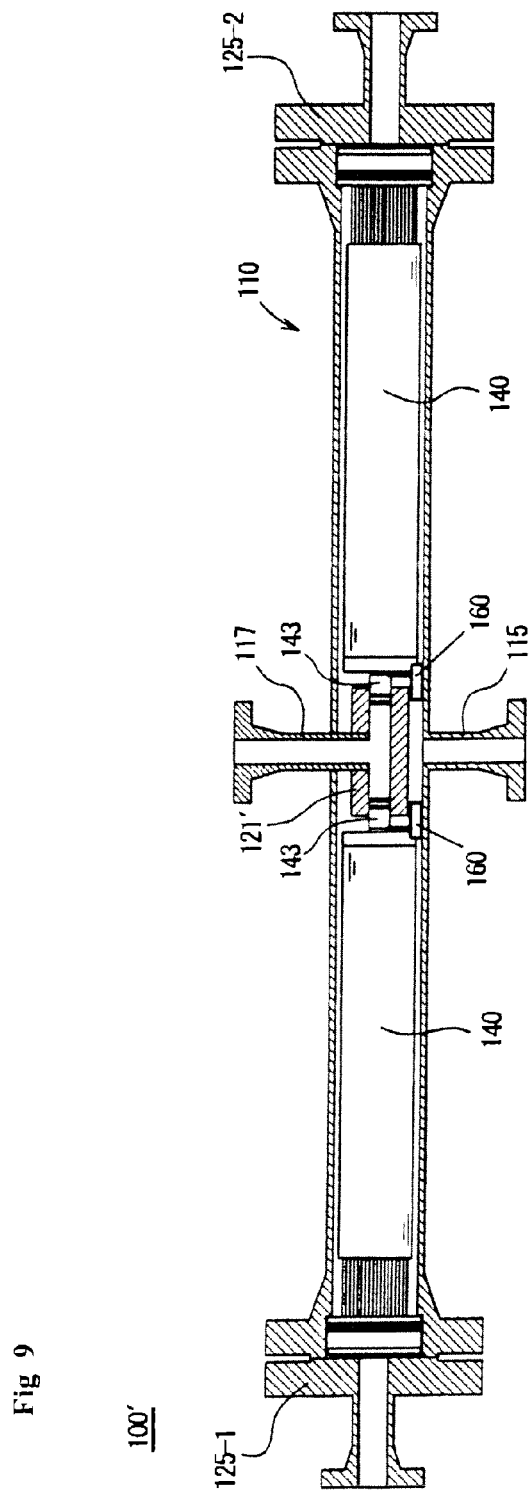
FIG. 9 is a sectional view showing the configuration of a gas separation membrane module according to a second embodiment of Section II.

In the gas separation membrane module according to the present invention, two hollow fiber elements 140 may be mounted as shown in FIG. 9. The gas separation membrane module 100' includes a cylindrical vessel 110' configured to be longer than that of the first embodiment and lid members 125-1, 125-2 attached to both ends thereof. Two hollow fiber elements 140 are disposed on the same axis within cylindrical vessel 110'.

A core-pipe holding portion 121' is provided at generally the center position of cylindrical vessel 110'. The core-pipe holding portion 121' is opened at both ends so that a nozzle portion 143 of one of the hollow fiber elements 140 is inserted into the opening, whereas a nozzle portion 143 of the other hollow fiber element 140 is inserted into the other side opening. A non-permeated gas discharge portion 117 is connected to the core-pipe holding portion 121' so that non-permeated gas can be discharged outside via the discharge portion 117.

In a configuration where two hollow fiber elements 140 are mounted in a cylindrical vessel 110' as described above, the same operation and effect as those in the first embodiment can be obtained, by preparing two guide members 160 for each hollow fiber elements 140 and then inserting the hollow fiber elements 140 using the guide member 160 similarly to the first embodiment.

Third Embodiment

In other embodiment of the present invention, a guide member 160 may be fixed to the hollow fiber element 140. This is advantageous not only in mounting hollow fiber element 140 but also in removing the element 140, since the element 140 can be pulled out while a nozzle position (height direction) being maintained precisely.

A means for fixing guide member 160 to hollow fiber element 140 is not limited particularly. Fixing can be conducted for example by fixing member such as a bolt, by welding, or by mechanical engaging. Guide member 160 may be removably fixed, however, the guide member may be fixed in an irremovable manner. Furthermore, guide member 160 may be integrated with any of members constituting a hollow fiber element 140. It is noted that, in this case, a guide member 160 constitutes a part of some member, rather than an independent member.

Fourth Embodiment

In the gas separation membrane module according to the present invention, a single or a plurality of hollow fiber elements may be disposed vertically within the vessel. In such a case, it is only required that a guide member should have a function of maintaining nozzle portion of a hollow fiber element at a predetermined position, for example at a center position in diameter direction within the cylindrical vessel. Thus, the guide member may have three, four, or five or more legs configured to generally abut on an inner periphery of cylindrical vessel. In this case, legs may be disposed uniformly in circumferential direction. Instead of the leg, rotatable elements such as a roller or a tire, configured to rotate within a cylindrical vessel generally in contact therewith may be used.

(Additional Notes on Configuration of Each Component)

Although several embodiments of the present invention have been described with reference to the drawings, the present invention is not limited to the specific configurations disclosed above. More specifically, the following may be used for the configuration of each component of the gas separation membrane module.

The present invention is applicable to any gas separation membrane module that includes a replaceable hollow fiber element, and requires the insertion of the hollow fiber element horizontally/vertically to connect the nozzle portion to the predetermined holding portion. It is noted that although the embodiments have been described mainly in conjunction with module of shell feed type, it goes without saying that the present invention is applicable to a module of a bore feed type.

With respect to a guide member, the number of legs 163 (see FIG. 3) is not limited to two, there could be three or more legs in a guide member. To obtain more smoothly sliding of leg 163, one or more ends of portion of leg 163 may have a narrower shape (that is, tapered shape or semispherical shape). It is possible to use a partially chamfered shape at lower side of the leg. Although FIG. 7 shows guide member 160 supporting nozzle portion 143, the position supported by guide member 160 is not limited thereto. A guide member may be configure to support a part of the hollow fiber element 140 to maintain a nozzle portion 143 at the predetermined position.

A mixed gas introducing port is preferably positioned on an opposite side to where a tube sheet of the hollow fiber element will be positioned when the element is mounted (that is, distal end side of the hollow fiber element). Particularly, the mixed gas introduced through the mixed gas introducing port is preferably not blown directly to the hollow fiber membrane. This is because such a preferable configuration can reduce possibility of breakage of the hollow fiber membrane as well as achieve uniform flow of the mixed gas.

Connection between the nozzle portion of the core pipe and the core-pipe holding portion is not limited to the connection made as described above. For example, the connection may be made through an intermediate connection member with corresponding shape to the core-pipe holding portion. In addition, the core-pipe holding portion may be a member integral with the vessel, instead of the member separate from the vessel. In other words, some portion of the vessel may have a function as a core-pipe holding portion.

DESCRIPTION OF REFERENCE NUMERALS

10 TUBE SHEET
100, 100' GAS SEPARATION MEMBRANE MODULE
110 CYLINDRICAL VESSEL
110a OPENING
111 CYLINDRICAL PORTION
112, 113 FLANGE PORTION
115 MIXED GAS INTRODUCING PORTION
115a MIXED GAS INTRODUCING CHANNEL
117 NON-PERMEATED GAS DISCHARGE PORTION
121, 121' CORE-PIPE FIXING PORTION
121a CENTRAL HOLE
125, 125-1, 125-2 LID MEMBER
125a, 127a GAS OUTLET
125b CHANNEL FORMING RECESS PORTION
127 LID MEMBER
140 HOLLOW FIBER ELEMENT
142 CORE PIPE
143 NOZZLE PORTION
143a TAPERED PORTION
143b ANNULAR GROOVE
145 FILM
146 PROXIMAL END CAP
146a ANNULAR GROOVE
147 PERFORATED PLATE
148 DISTAL END CAP
148a FRONT FACE
149 HOLLOW FIBER BUNDLE
160 GUIDE MEMBER
161 BODY PORTION
161s SUPPORT PORTION
163 LEG PORTION
163a LONG PORTION
163b SHORT PORTION
170, 170-1 PERFORATED PLATE
171a FLAT FACE
171b CHANNEL FORMING RECESS PORTION
171c STEPPED PORTION
172a FLAT FACE
172b RECESS PORTION
172c CENTRAL PORTION
172e BOTTOM FACE
175 THROUGH HOLE
177 GAS CHANNEL
179 HOLE
A140 EXPOSED PORTION
S1 THROUGH HOLE FORMED REGION

The invention claimed is:

1. A gas separation membrane module, comprising:
a hollow fiber element having a hollow fiber bundle consisting of a number of hollow fiber membranes and a tube sheet provided at an end of the hollow fiber bundle for binding the hollow fiber membranes;
a vessel having an opening through which the hollow fiber element is inserted or removed;
a lid member having a gas outlet formed therein and attached to cover the opening of the vessel; and
a perforated plate having a plurality of through holes for forming gas channels formed therein, the perforated plate being mounted between the tube sheet and the lid member,
the gas separation membrane module performing gas separation by supplying mixed gas to the hollow fiber membranes,
wherein the perforated plate has:
(a) a flat portion, on a surface closer to the lid, the flat portion configured to generally be in contact with the lid member when mounted; and,
(b) a channel forming recess portion, formed in a portion of the surface closer to the lid other than the flat portion, for forming a gas channel;
(c) said through hole being formed to extend over the flat portion and the channel forming recess portion in a planar view of the perforated plate, so that the through hole can communicates with the channel forming recess portion.

2. The gas separation membrane module according to claim 1, wherein at least one of the through holes is formed as an elongated hole.

3. The gas separation membrane module according to claim 2, wherein all the through holes are elongated holes, each elongated holes formed radially in a planar view of the perforated plate.

4. The gas separation membrane module according to claim 1, wherein the channel forming recess portion is formed at an area facing to the gas outlet in the lid member.

5. The gas separation membrane module according claim 1, wherein the perforated plate further has:
   (d) a recess portion, formed in a surface closer to the tube sheet, for forming a gas channel for directing a gas from an end portion of the tube sheet to the through hole.

6. The gas separation membrane module according to claim 1, wherein the hollow fiber element further has, in addition to the hollow fiber bundle and the tube sheet, a core pipe disposed substantially at the center of the hollow fiber bundle, a first end of the core pipe being bonded to the tube sheet and a second end configured to be fixed to a portion within the vessel.

* * * * *